US010912098B2

(12) United States Patent
Suzuki

(10) Patent No.: US 10,912,098 B2
(45) Date of Patent: Feb. 2, 2021

(54) COMMUNICATION SYSTEM, COMMUNICATION DEVICE, CONTROL DEVICE AND COMMUNICATION CONTROL METHOD

(71) Applicant: YAMAHA CORPORATION, Hamamatsu (JP)

(72) Inventor: Hirokazu Suzuki, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 0 days.

(21) Appl. No.: 16/358,766

(22) Filed: Mar. 20, 2019

(65) Prior Publication Data

US 2020/0029339 A1    Jan. 23, 2020

(30) Foreign Application Priority Data

Mar. 22, 2018    (JP) .................................. 2018-054205

(51) Int. Cl.
*H04W 72/10* (2009.01)
*H04W 72/04* (2009.01)
*H04W 84/12* (2009.01)

(52) U.S. Cl.
CPC ......... *H04W 72/10* (2013.01); *H04W 72/048* (2013.01); *H04W 84/12* (2013.01)

(58) Field of Classification Search
CPC ............................ H04W 72/10; H04W 72/048
See application file for complete search history.

(56) References Cited

U.S. PATENT DOCUMENTS

| 7,949,812 | B1 * | 5/2011 | Wong | H04B 7/00 |
| 2005/0033890 | A1 * | 2/2005 | Lee | H05K 7/10 |
| 2007/0211624 | A1 * | 9/2007 | Schmidt | H04J 3/14 |
| 2010/0290414 | A1 * | 11/2010 | Yamada | H04W 72/04 |
| 2010/0302966 | A1 | 12/2010 | Matsuura | |
| 2011/0261797 | A1 * | 10/2011 | Yamaguchi | H04W 4/02 |
| 2017/0156149 | A1 * | 6/2017 | Lin | H04W 72/04 |

FOREIGN PATENT DOCUMENTS

JP    2010278825 A    12/2010

* cited by examiner

*Primary Examiner* — Ronald B Abelson
(74) *Attorney, Agent, or Firm* — Rossi, Kimms & McDowell LLP

(57) ABSTRACT

A communication device includes a first module, a communication portion communicating with a second module, a memory, and a processor that executes instructions stored in the memory. The instructions cause the processor to perform: executing a processing of changing a first radio communication to a non-restrictive state when a first signal is received from the second module in a state that the first radio communication is in a restrictive state; and executing a first processing of transmitting a second signal for changing a second radio communication to the non-restrictive state to the second module and a second processing of changing the first radio communication to the restrictive state when the priority signal using the first channel is detected in a state that the first radio communication is in the non-restrictive state.

20 Claims, 10 Drawing Sheets

| MODULE | CHANNEL | WAIT FLAG |
|--------|---------|-----------|
| Ma | Ch(Ma) | F(Ma) |
| Mb | Ch(Mb) | F(Mb) |

| DRIVE MODE | CHANNEL | WAIT FLAG | MODULE | OUTPUT |
|------------|---------|-----------|--------|--------|
| M1 | Ch(M1) | F(M1) | M(M1) | T(M1) |
| M2 | Ch(M2) | F(M2) | M(M2) | T(M2) |

COMMUNICATION SYSTEM, COMMUNICATION DEVICE, CONTROL DEVICE AND COMMUNICATION CONTROL METHOD

CROSS REFERENCE TO RELATED APPLICATIONS

This application is based on Japanese Patent Application (No. 2018-054205) filed on Mar. 22, 2018, the contents of which are incorporated herein by reference.

BACKGROUND OF THE INVENTION

1. Field of the Invention

The present invention relates to a technology of controlling communication.

2. Description of the Related Art

In radio communications such as a wireless LAN, a 2.4 GHz band and a 5 GHz band are used as communication bands. In using bands called W53 and W56 in the 5 GHz band, it is necessary to provide a function for avoiding interference with military and weather radar systems. This function is called DFS (Dynamic Frequency Selection) function. The DFS function executes the following processing. First, when radio communication is started by using a channel classified as W53/W56, processing of checking that a specific radar signal (hereinafter, referred to merely as radar signal) is not detected for one minute before the start of the radio communication is necessary. This processing is called CAC (Channel Availability Check). When the radar signal is detected by the CAC, it is necessary to halt the use of the channel for 30 minutes in order to prioritize the use of the radar signal. Generally, when the radar signal is detected, the channel is changed to seek the restart of the radio communication. However, after the radar signal is detected, even if a channel not used by the radar signal is newly used, radio communication cannot be performed for one minute. The state where radio communication is being performed is called ISM (In-Service Monitoring).

A technology using a module for radar signal detection separately from a module for terminal communication in order to reduce the period where radio communication cannot be performed as described above is disclosed in JP-A-2010-278825. According to this technology, in the module for radar signal detection, the CAC is previously executed on a channel different from the channel being used by the module for terminal communication. Thereby, even if the radar signal is detected at the channel under communication, the period where radio communication cannot be performed can be reduced by switching the channel under communication to the channel on which the CAC has been performed.

On the other hand, even the use of this technology lacks efficiency for reasons such that radio communication cannot be performed during the time required for the channel changing processing and that the module for radar signal detection cannot be used for terminal communication.

SUMMARY

One of objects of the present invention is to more efficiently implement a structure for reducing the period where radio communication cannot be performed.

According to one of exemplary embodiments of the present invention, a communication device is provided that has: a first module configured to perform a first radio communication using a first channel and to detect a priority signal using the first channel; a communication portion communicating with a second module that is configured to perform a second radio communication using a second channel different from the first channel and to detect a priority signal using the second channel; a memory that stores instructions; and a processor that executes the instructions, wherein the instructions cause the processor to perform: executing a processing of changing the first radio communication to a non-restrictive state when a first signal is received from the second module in a state that the first radio communication is in a restrictive state, and executes a first processing of transmitting a second signal for changing the second radio communication to the non-restrictive state to the second module and a second processing of changing the first radio communication to the restrictive state when the priority signal using the first channel is detected in a state that the first radio communication is in the non-restrictive state.

Moreover, according to one of exemplary embodiments of the present invention, a communication system is provided that has: a first module configured to perform a first radio communication using a first channel and to detect a priority signal using the first channel; a second module configured to perform a second radio communication using a second channel different from the first channel and to detect a priority signal using the second channel; a memory that stores instructions; and a processor that executes the instructions, wherein the instructions cause the processor to perform: executing a first processing of changing the second radio communication to a non-restrictive state and second processing of changing the first radio communication to a restrictive state when the priority signal using the first channel is detected in a state that the first radio communication is in the non-restrictive state and the second radio communication is in the restrictive state.

Moreover, according to one of exemplary embodiments of the present invention, a control device is provided that is a device for controlling a first module that performs a first radio communication using a first channel and detects a priority signal using the first channel and a second module that performs a second radio communication using a second channel different from the first channel and detects a priority signal using the second channel, and the control device having a memory that stores instructions and a processor that executes the instructions, wherein the instructions cause the processor to perform: executing a first processing of changing the second radio communication to a non-restrictive state and a second processing of changing the first radio communication to a restrictive state when the priority signal using the first channel is detected in a state that the first radio communication is in the non-restrictive state and the second radio communication is in the restrictive state.

Moreover, according to one of exemplary embodiments of the present invention, a communication control method of controlling a first module that performs a first radio communication using a first channel and detects a priority signal using the first channel and a second module that performs a second radio communication using a second channel different from the second channel and detects a priority signal using the second channel, the control method having: executing a first processing of changing the second radio communication to a non-restrictive state and a second processing of changing the first radio communication to a restrictive state when the priority signal using the first channel is detected in a state that the first radio communication is in the non-restrictive state and the second radio communication is in the restrictive state.

According to one of the exemplary embodiments of the present invention, a structure or a process for reducing the period where radio communication cannot be performed can be more efficiently implemented.

DETAILED DESCRIPTION OF THE EXEMPLARY EMBODIMENTS

Figure 1:
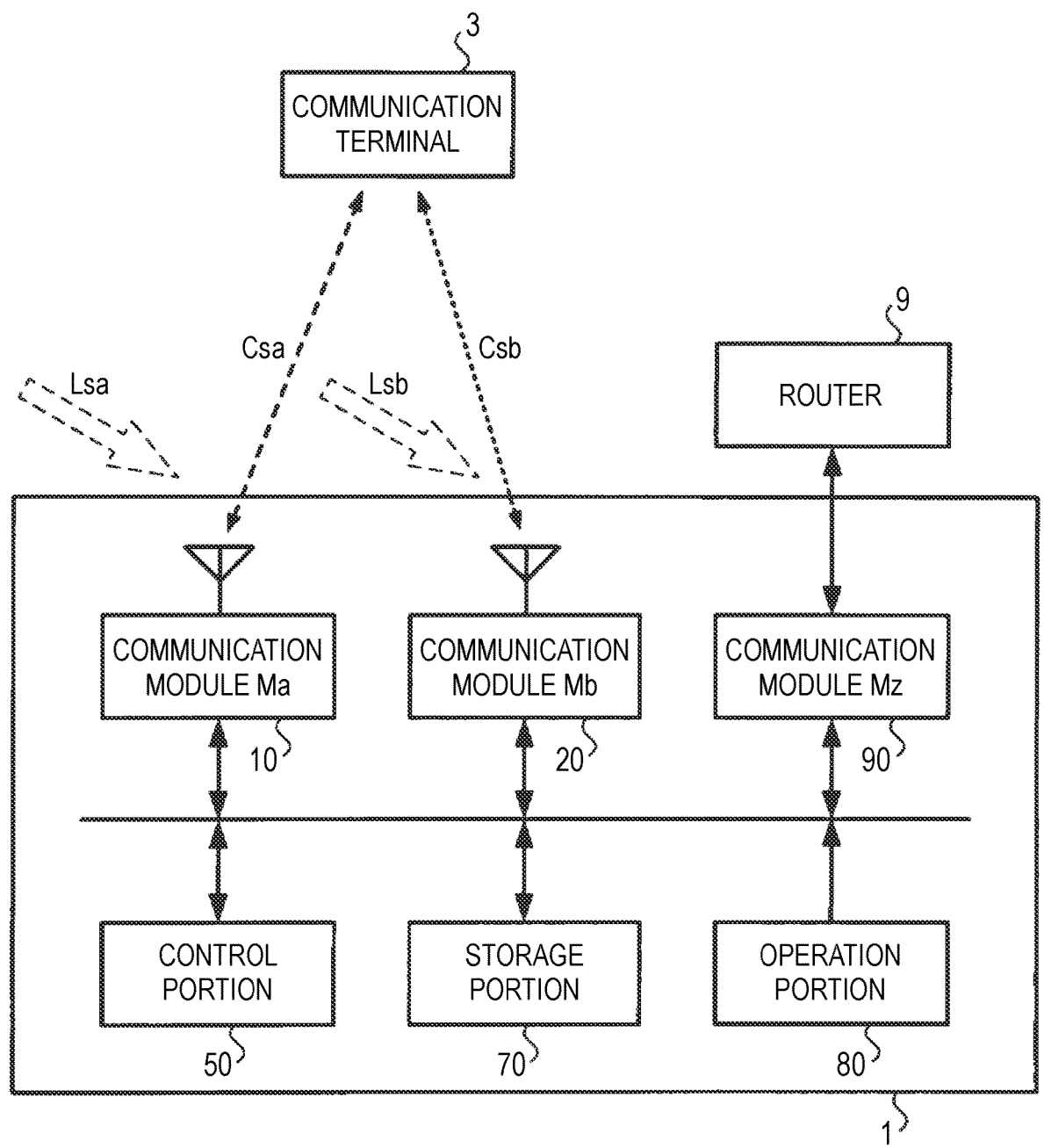
FIG. 1 is a view explaining the structure of a communication system in a first embodiment of the present invention.

Hereinafter, communication systems in embodiments of the present invention will be described in detail with reference to the drawings. The embodiments shown below are examples of embodiments of the present invention, and the present invention should not be interpreted within the bounds of these embodiments. In the drawings referred to in these embodiments, the same parts or parts having similar functions are denoted by the same reference designations or similar reference designations (reference designations formed of numerals just followed by A, B or the like), and repetitive descriptions thereof are sometimes omitted.

First Embodiment

[1. Overview]

A communication system in a first embodiment of the present invention is implemented by an access point that relays radio communication. This access point is a communication device that performs radio communication using at least the 5 GHz band, and is capable of executing processing corresponding to the DFS function. At this time, the access point can efficiently reduce the period where radio communication cannot be performed, by a method described below.

The access point in the first embodiment will be described. The communication system may be implemented by a router instead of the access point.

[2. Structure of the Access Point]

FIG. 1 is a view explaining the structure of the communication system in the first embodiment of the present invention. The access point 1 is a device that provides a communication terminal 3 with a wireless LAN environment, and is a device that performs a relay for connecting the communication terminal 3 to a WAN (the Internet, etc.) through a router 9. While one communication terminal 3 is shown in FIG. 1, more than one communication terminal 3 may be present.

The access point 1 includes a communication module Ma10 (hereinafter, sometimes referred to merely as "Ma"), a communication module Mb20 (hereinafter, sometimes referred to merely as "Mb"), a control portion 50, a storage portion 70, an operation portion 80 and a communication module Mz90. These elements are interconnected by buses. The communication system in this example includes the communication module Ma10, the communication module Mb20 and the control portion 50, and constitutes part of the access point 1 by being accommodated in one housing.

The communication module Ma10 executes a radio communication Csa with the communication terminal 3 and the detection of a radar signal Lsa by using, of the channels in the 5 GHz band, a channel that is set by the control portion 50. The channel that is set to the communication module Ma10 is selected from among the channels included in the types W53 and W56 in the IEEE 802.11 standard.

The communication module Mb20 executes a radio communication Csb with the communication terminal 3 and the detection of a radar signal Lsb by using, of the channels in the 5 GHz band, a channel that is set by the control portion 50. Although the channel that is set to the communication module Mb20 is different from the channel that is set to the communication module Ma10, it is the same in that it is selected from among the channels included in the types W53 and W56. There are cases where a channel included in a type W52, that is, a channel where radar signal detection is not performed is temporarily set to the communication module Ma10 and the communication module Mb20.

The radar signals Lsa and Lsb are shown in different expressions for descriptive purposes in order to distinguish a communication module detectable by a channel. Therefore, when the detectable communication module is described as a common item without being distinguished, they are sometimes shown as radar signal Ls (priority signal).

Although the channels that are set to the communication module Ma10 and the communication module Mb20 are different from each other as described above, it is desirable that other settings (for example, the transmission/reception rate set, the security setting) be the same. By doing this, even if the communication module that communicates with the communication terminal 3 is changed, the communication terminal 3 can perform communication as it is only by changing the setting of the channel being used. To the communication terminal 3, this is an operation similar to roaming between access points. Some settings may be different between the communication module Ma10 and the communication module Mb20.

In this example, the communication module Mz90 has the function as a communication portion for communicating with the router 9 and communicating with other devices through the router 9. This communication may be, for example, by radio using the 2.4 GHz band or by cable.

Figures 4, 5, 6:
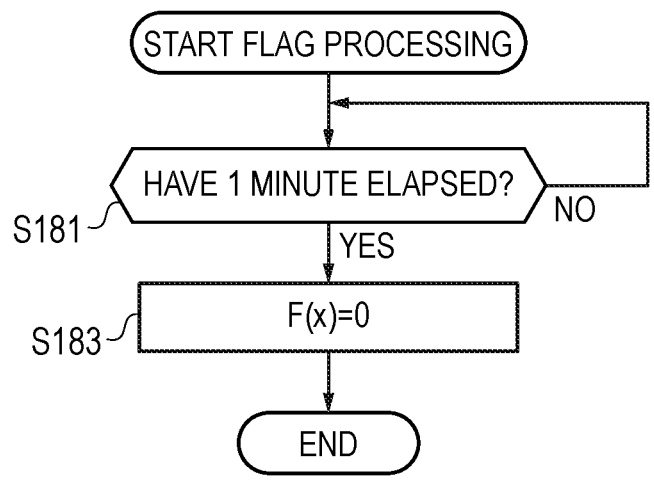
FIG. 4 is a view explaining a module management table in the first embodiment of the present invention.
FIG. 5 is a flowchart explaining flag processing in the first embodiment of the present invention.
FIG. 6 is a view explaining a drive mode management table in the first embodiment of the present invention.

The storage portion 70 stores a control program executed by the control portion 50 and information such as various tables. The tables stored in the storage portion 70 include, for example, management tables as shown in FIG. 4 and FIG. 6 described later, and are updated by the control portion 50. The operation portion 80 includes operation members such as a power button and a setting button, accepts user's operations on the operation members, and outputs signals responsive to the operations to the control portion 50.

The control portion 50 includes an arithmetic processing circuit such as a CPU, and a memory. The control portion 50 executes the control program stored in the storage portion 70 by the CPU to implement various functions at the access point 1. The implemented functions include a communication control function. According to this communication control function, later-described processing (hereinafter, referred to as communication control processing) can be executed.

The control program may be any that is executable by a computer, and may be provided in a state of being stored in a computer-readable recording medium such as a magnetic recording medium, an optical recording medium, a magneto-optical recording medium or a semiconductor memory. In this case, the access point 1 may be any that is provided with a device that reads the recording medium. Moreover, the control program may be downloaded through a communication module. Subsequently, the communication control processing (communication control method) will be described.

[3. Communication Control Processing]

The communication control processing is started by the power-on at the access point 1. First, an overview of the entire communication control processing will be described, and then, details of each processing will be described.

Figure 2:
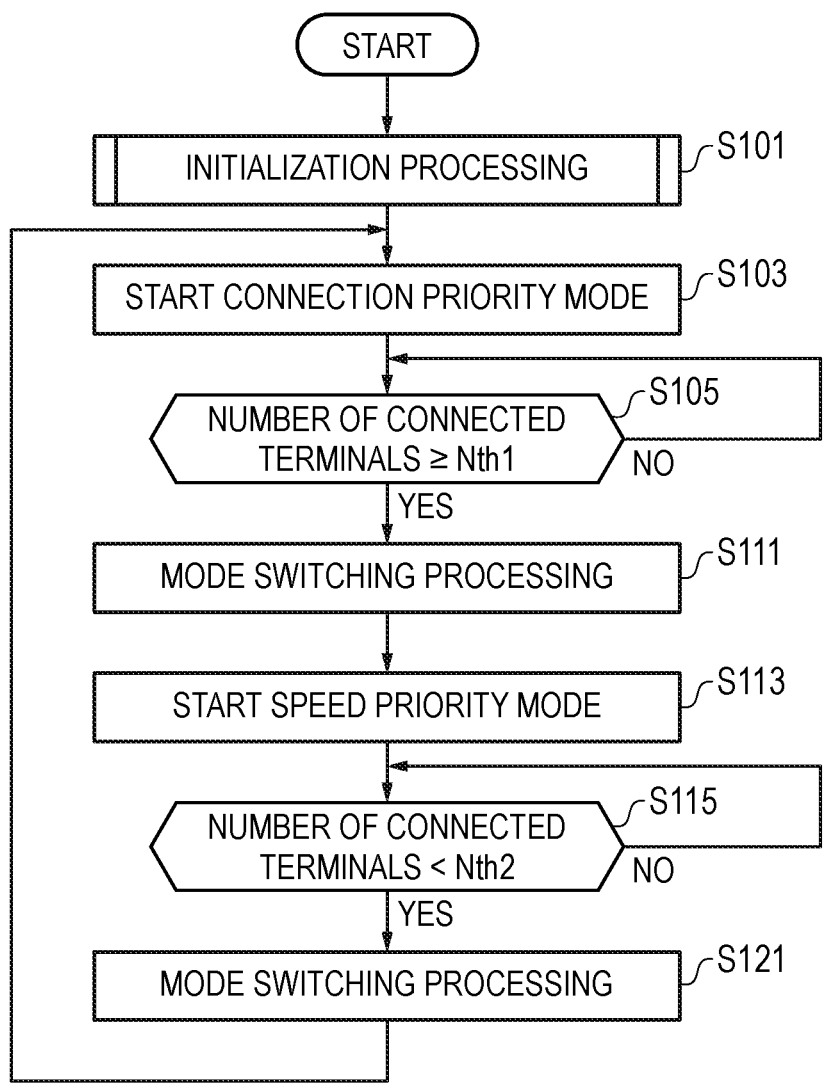
FIG. 2 is a flowchart explaining communication control processing in the first embodiment of the present invention.

FIG. 2 is a flowchart explaining the communication control processing in the first embodiment of the present invention. When the communication control processing is started, the control portion 50 executes initialization processing (step S101). When the initialization processing is ended, the control portion 50 starts a connection priority mode (step S103). In the connection priority mode, the access point 1 operates so that one of the communication modules Ma10 and Mb20 is set to a state where communication with the communication terminal 3 is possible (ISM) and the other thereof is set to a state where the radar signal Ls is detected (CAC). Although details will be described later, according to the connection priority mode, processing can be realized that minimizes the period where radio communication cannot be performed when the radar signal Ls is received.

In the period where the processing of the connection priority mode is executed, the control portion 50 continues a determination as to whether or not the number of communication terminals 3 connected to the access point 1 becomes not less than a predetermined threshold value Nth1 (step S105; No), and when determining that the number becomes not less than the threshold value Nth1 (step S205; Yes), the control portion 50 executes mode switching processing (step S111) and starts a speed priority mode (step S113). In the speed priority mode, the access point 1 operates so that both of the communication modules Ma10 and Mb20 are set to a state where communication with the communication terminal 3 is possible (ISM) to make the communication band wider than that in the connection priority mode. Thereby, reduction in communication speed can be suppressed even if a large number of communication terminals 3 are connected to the access point 1. On the other hand, since the communication module having detected the radar signal Ls cannot perform communication for at least one minute, there are cases where the communication speed is unstable as a whole.

In the period where the processing of the speed priority mode is executed, the control portion 50 continues a determination as to whether the number of connected communication terminals 3 becomes less than a predetermined threshold value Nth2 or not (step S115; No), and when determining that the number becomes less than the threshold value Nth2 (step S115; Yes), the control portion 50 executes the mode switching processing (step S121) and starts the connection priority mode again (step S103). The threshold value Nth1 and the threshold value Nth2 may be either the same or different from each other as long as the threshold value Nth1 is not less than the threshold value Nth2.

While in this example, the operation mode of the access point 1 is selected from between the two of the connection priority mode and the speed priority mode, a structure may be adopted where only the connection priority mode is executed irrespective of the number of connected communication terminals 3. Moreover, while in this example, the operation mode switching is executed according to the number of communication terminals 3 connected to the access point 1, it may be executed according to the traffic at the access point 1.

The above-described communication control processing ends when the power is turned off or switching to another communication control processing is made at the access point 1. Subsequently, details of each processing (initialization processing, etc.) in the communication control processing will be described.

[3-1. Initialization Processing]

Figure 3:
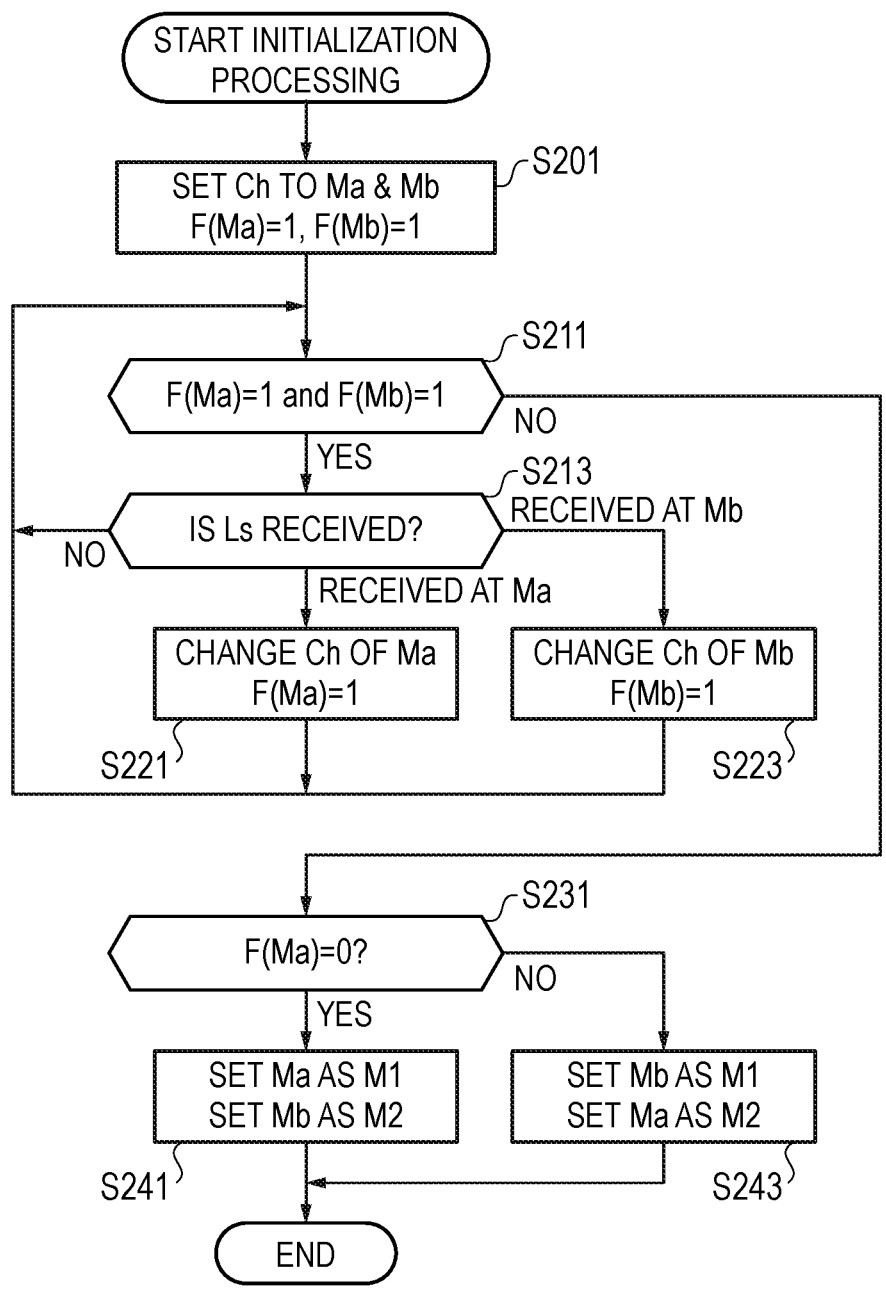
FIG. 3 is a flowchart explaining initialization processing in the first embodiment of the present invention.

FIG. 3 is a flowchart explaining the initialization processing in the first embodiment of the present invention. When the initialization processing is started, the control portion 50 sets the channel used for radio communication to the communication modules Ma10 and Mb20, and sets the wait flag to 1 (step S201). The set channel may be a predetermined channel, may be a channel that is set at the time of the previous power-off, or may be determined according to a past history (for example, the frequency of use of the channel, or the frequency of reception of the radar signal Ls). This setting is registered in a module management table stored in the storage portion 70. Setting is made so that the channel that is set to the communication module Ma10 and the channel that is set to the communication module Mb20 are different from each other.

FIG. 4 is a view explaining the module management table in the first embodiment of the present invention. The module management table associates, for the communication modules, the channels that are set to the communication modules with wait flags. The channel and the wait flag associated with the communication module Ma10 are expressed as Ch(Ma) and F(Ma). The channel and the wait flag associated with the communication module Mb20 are expressed as Ch(Mb) and F(Mb).

In each processing described later, when the radar signal Ls is detected, the wait flag corresponding to the detected communication module is set to "1". Describing in more detail, in the case of the period where it is checked that the radar signal Ls is not used at a new channel by the reception of the radar signal Ls (CAC), the wait flag takes "1". In the period other than that, that is, in the period where radio communication with the communication terminal 3 can be possible (ISM), the wait flag takes "0".

For example, the period where F(Ma) is 1 corresponds to the period where the communication module Ma10 is at the CAC. On the other hand, while the period where F(Ma) is 0 corresponds to being the period where the communication module Ma10 can operate with the ISM, in this example, it is also a state where radio communication with the communication terminal 3 is restricted even in the period where the communication module Ma10 can operate with the ISM (a state where the communication module Ma10 does not operate as the ISM).

FIG. 5 is a flowchart explaining the flag processing in the first embodiment of the present invention. The flag processing shown in FIG. 5 is started when the wait flag F(x) is set to 1 in another processing. The flag processing is executed in parallel with various other kinds of processing including the initialization processing. Here, x includes later-described M1 and M2 in addition to Ma and Mb, and in association with the corresponding flags, the flag processing is executed independent of each other.

The control portion 50 waits for one minute to have elapsed since the wait flag F(x) is set to 1 (step S181; No), and when one minute elapses (step S181; Yes), the control portion 50 sets F(x) to 0 (step S183). While this one minute corresponds to the period of the CAC, it may be set as a given time of not less than one minute according to the necessity, or may be set as a time of less than one minute in accordance with a change in the standard or the like. In a case where F(x) is again set to 1 in another processing before F(x) is set to 0, the control portion 50 resets the time measurement and resumes the flag processing from the beginning.

Returning to FIG. 3, description will be continued. After performing the channel setting and the flag setting, the control portion 50 waits for the radar signal Ls to be received in the period where F(Ma) is 1 and F(Mb) is 1 (step S211; Yes, step S213; No). When the radar signal Ls is received at the communication module Ma10 (step S213; received at Ma), the control portion 50 changes the channel Ch(Ma) of the communication module Ma10, and sets F(Ma) to 1. At this time, Ch(Ma) is set as a channel different from Ch(Mb). Ch(Ma) may be not changed. However, according to the current standard, the use of the channel having detected the radar signal Ls is restricted for thirty minutes. For this reason, when this standard is present, Ch(Ma) is changed, and after the detection of the radar signal Ls, the control portion 50 performs control so that no communication module can use this channel for thirty minutes. For example, the control portion 50 determines whether the channel is usable or not by processing similar to the above-described processing using the wait flag for each target channel. In this regard, in the following description, in the processing of changing the channel in association with the detection of the radar signal Ls (similar in connection switching processing and the like other than the initialization processing), although it is unnecessary to change the channel, it is desirable to change the channel for similar reasons.

When the radar signal Ls is received at the communication module Mb20 (step S213; received at Mb), the control portion 50 changes the channel Ch(Mb) of the communication module Mb20, and sets F(Mb) to 1. At this time, Ch(Mb) is set as a channel different from Ch(Ma). Ch(Mb) may be not changed.

When F(Ma) or F(Mb) is set to "0" by the above-described flag processing (step S211; No), the control portion 50 shifts to the processing of setting a drive mode to the communication module. That is, when F(Ma) is 0 (step S231; Yes), the control portion 50 sets the communication module Ma10 as a drive mode (M1), and sets the communication module Mb20 as a drive mode M2 (step S241). On the other hand, when F(Ma) is not 0 (step S233; No), that is, when only F(Mb) is "0", the control portion 50 sets the communication module Ma10 as the drive mode M2, and sets the communication module Mb20 as the drive mode M1 (step S241). With this, the initialization processing ends.

The drive mode M1 corresponds to driving the communication module to a state where radio communication with the communication terminal 3 is possible (non-restrictive state). On the other hand, the drive mode M2 corresponds to driving the communication module to a state where radio communication with the communication terminal 3 is halted (restrictive state). The channel and the wait flag are also taken over according to the set drive mode. For example, when M1 is set to Ma, F(Ma) is taken over as F(M1). Likewise, regarding the channel, the channel Ch(Ma) set to Ma is taken over as Ch(M1).

FIG. 6 is a view explaining a drive mode management table in the first embodiment of the present invention. The drive mode management table associates channels, wait flags, communication modules and outputs (the presence or absence of communication restriction) with the drive modes. The channel, wait flag, communication module and output associated with the drive mode M1 are expressed as Ch(M1), F(M1), M(M1) and T(M1), respectively. The channel, wait flag, communication module and output associated with the drive mode M2 are expressed as Ch(M2), F(M2), M(M2) and T(M2), respectively. For example, when the communication module Ma10 is associated with the drive mode M1, M(M1) is Ma. Moreover, regarding the output, T is "ON" (non-restrictive state) when it indicates a state where communication with the communication terminal 3 is possible, and is "OFF" (restrictive state) when it indicates a state where communication cannot be performed with the communication terminal 3. Here, even in the restrictive state, the radar signal Ls can be detected and the CAC can be executed.

[3-2. Connection Priority Mode]

Subsequently, the processing of the connection priority mode started at step S103 of FIG. 2 will be described. In the connection priority mode, as described above, the access point 1 operates so that for one of the communication modules Ma10 and Ma20, radio communication with the communication terminal 3 is in the non-restrictive state, for the other thereof, radio communication with the communication terminal 3 is in the restrictive state and both thereof are in the state where the radar signal Ls is detected. When the radar signal Ls is detected in the non-restrictive state, that is, at the communication module driven by the ISM, the communication module is set to the restrictive state and changed so as to operate by the CAC and the other communication module is changed so as to operate as the ISM in the non-restrictive state, thereby reducing the period during which radio communication cannot be performed between the communication terminal 3 and the access point 1. Hereinafter, an example of the processing will be concretely described.

In the initialization processing, the drive mode M1 or M2 is set to the communication module Ma10, and the other drive mode is set to the communication module Mb20. In the following description, the contents of the processing are controlled by the drive mode. Therefore, in the following description, the communication modules Ma10 and Mb20 are expressed as M(M1) or M(M2) according to the set drive mode.

Figure 7:
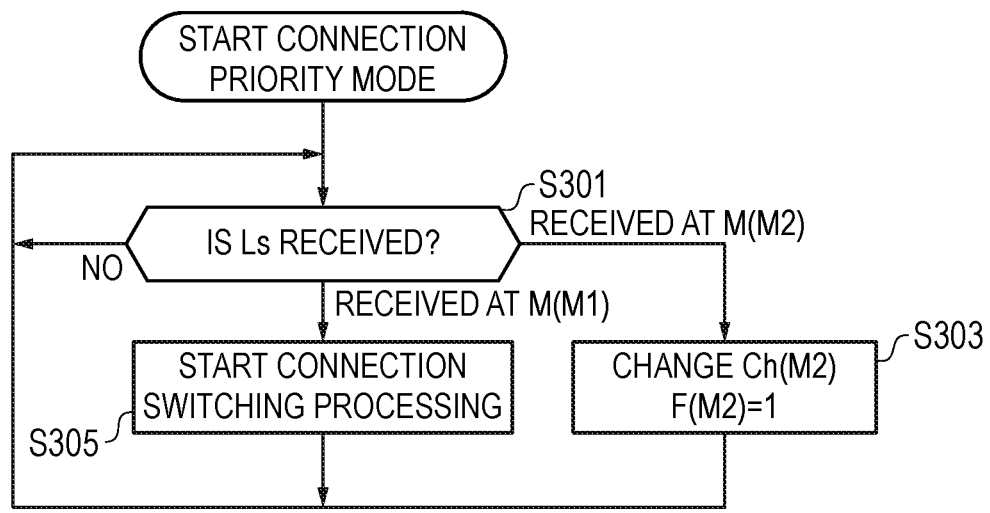
FIG. 7 is a flowchart explaining processing in a connection priority mode in the first embodiment of the present invention.

FIG. 7 is a flowchart explaining the processing in the connection priority mode in the first embodiment of the present invention. When the connection priority mode is started, the control portion 50 waits for the radar signal Ls to be received (step S301; No). When the radar signal Ls is received at M(M2) (step S301; received at M2), the control portion 50 changes the channel Ch(M2) at M(M2), sets F(M2) to 1 (step S303), and again waits for the radar signal Ls to be received (step S301; No). At this time, Ch(M2) is set as a channel different from Ch(M1). Ch(M2) may be not changed.

On the other hand, when the radar signal Ls is received at M(M1) (step S301; received at M1), the control portion 50 starts the connection switching processing (step S305), and again waits for the radar signal Ls to be received (step S301; No.).

[3-3. Connection Switching Processing]

The connection switching processing is processing for switching the communication module to which the communication terminal 3 is connected by radio communication when the radar signal Ls is received at the communication module driven by the drive mode M1, that is, at M(M1).

Figure 8:
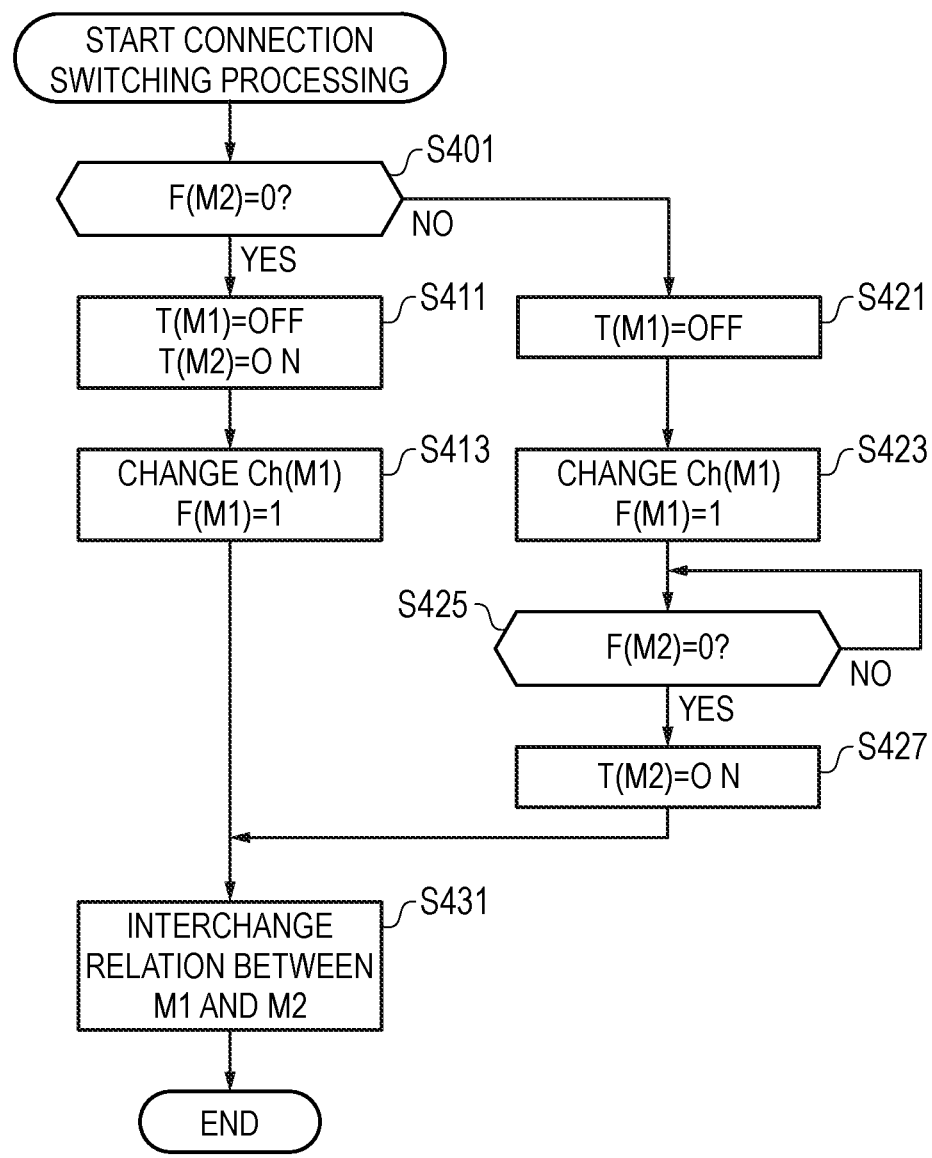
FIG. 8 is a flowchart explaining connection switching processing in the first embodiment of the present invention.

FIG. 8 is a flowchart explaining the connection switching processing in the first embodiment of the present invention. When the connection switching processing is started, the control portion 50 determines whether M(M2) is in a state of being changeable to the ISM (non-restrictive state) or not, that is, whether F(M2) is 0 or not (step S401). When M(M2) is in the state of being changeable to the ISM, that is, F(M2) is 0 (step S401; Yes), the control portion 50 sets T(M1) to OFF, and sets T(M2) to ON (step S411). Thereby, M(M1) is changed from the state where communication can be performed with the communication terminal 3 (non-restrictive state) to the state where communication cannot be performed (restrictive state), and the CAC is started at Ch(M1). Moreover, M(M2) is changed from the restrictive state to the non-restrictive state, and the ISM is started at Ch(M2).

Then, the control portion 50 changes the channel Ch(M1) at M(M1), and sets F(M1) to 1 (step S413). Thereby, the CAC is started at Ch(M1). At this time, Ch(M1) is set as a channel different from Ch(M2). Ch(M1) may be not changed.

Thereafter, the control portion 50 interchanges the relation between M1 and M2 in the drive mode management table (step S431), and ends the connection switching processing. When the relation between M1 and M2 is interchanged, in the drive mode management table, the parameters associated with the drive mode M1 are interchanged to the parameters associated with the drive mode M2. For example, the values of M(M1) and M(M2) are interchanged. Here, at steps S411 and S413, the communication module where communication restriction is removed corresponds to the drive mode M1, and the communication module where communication is restricted corresponds to the drive mode M2. Thereby, a state is brought about where the drive modes of the communication modules Ma10 and Ma20 are interchanged from those at the start of the connection priority mode.

Returning to step S401, description will be given. When M(M2) is in a state where switching to the ISM cannot be made (in the middle of the CAC), that is, when F(M2) is 1 (step S401; No), the control portion 50 sets T(M1) to OFF (step S421). Then, the control portion 50 changes the channel Ch(M1) at M(M1), and sets F(M1) to 1 (step S423). Thereby, M(M1) is changed from the state where communication with the communication terminal 3 can be performed (non-restrictive state) to the state where communication cannot be performed (restrictive state), and the CAC is started at Ch(M1). At this time, Ch(M1) is set as a channel different from Ch(M2). Ch(M1) may be not changed.

Since M(M2) is in the state where switching to the ISM cannot be made (F(M2)=1) in this state, the control portion 50 waits for F(M2) to be set to 0 by the flag processing (step S425; No). When the radar signal Ls is received at M(M2) at this time, step S303 is executed according to the determination at step S301 shown in FIG. 7.

When F(M2) is set to 0 (step S425; Yes), the control portion 50 sets T(M2) to ON (step S427). Thereby, M(M2) is changed from the restrictive state to the non-restrictive state, and the ISM is started at Ch(M2). Thereafter, as described above, the control portion 50 interchanges the relation between M1 and M2 in the drive mode management table (step S431), and ends the connection switching processing.

By this connection switching processing, the connection relation between the communication terminal 3 and the communication modules Ma10 and Mb20 changes as follows: First, it is assumed that M(M1) is the communication module Ma10 and M(M2) is the communication module Mb20. At this time, the communication module Mb20 is in a state where communication cannot be performed with the communication terminal 3 although the radar signal Ls is detected (restrictive state). Therefore, the communication module Mb20 is in a state where change to the ISM is not performed even if such change is made possible by performing the CAC. On the other hand, the communication module Ma10 is in a state where communication can be performed with the communication terminal 3 while the radar signal Ls is detected (non-restrictive state). That is, the communication module Ma10 is in the ISM state.

Here, when the communication module Mb20 detects the radar signal Ls, the CAC is started. At this time, the channel of the communication module Mb20 may be either changed or not changed. On the other hand, when the communication module Ma10 detects the radar signal Ls, the communication module Mb20 changes to the ISM state as the non-restrictive state and the communication module Ma10 changes to the CAC as the restrictive state. Thereby, communication between the communication terminal 3 and the communication module Ma10 is cut and as a consequence, the communication terminal 3 starts radio communication with the communication module Mb20. At this time, it is necessary only that at the communication terminal 3, communication with the access point 1 be continued and the channel of radio communication be changed. For this reason, the period hardly occurs where radio communication cannot be performed.

[3-4. Speed Priority Mode]

Then, when the number of communication terminals 3 connected to the access point 1 becomes not less than the threshold value Nth1 while the connection priority mode is being executed (step S105; Yes), the mode switching processing to switch from the connection priority mode to the speed priority mode is executed (step S111). This mode switching processing corresponds to switching the radio communication of the communication module M(M2) driven by the drive mode M2 from the restrictive state to the non-restrictive state, that is, setting T(M2) from OFF to ON. Thereby, both M(M1) and M(M2) become the ISM state where radio communication can be performed with the communication terminal 3 (non-restrictive state). This state is the speed priority mode.

Figure 9:
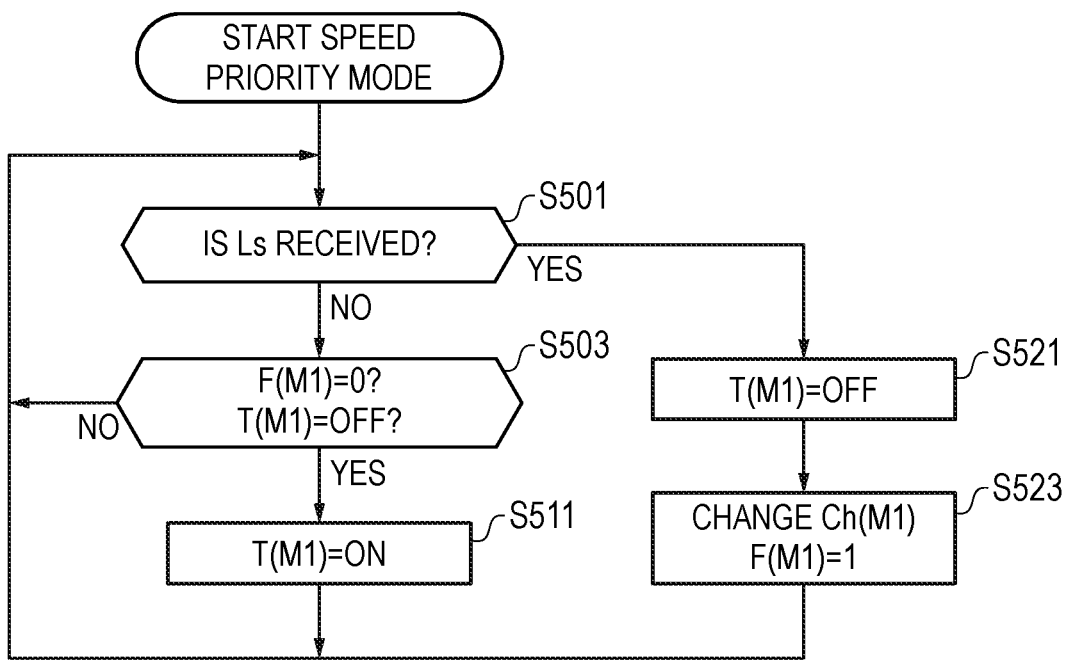
FIG. 9 is a flowchart explaining processing by a speed priority mode in the first embodiment of the present invention.

FIG. 9 is a flowchart explaining the processing by the speed priority mode in the first embodiment of the present invention. The flow shown in FIG. 9 explains the processing at the communication module M(M1). By the above-described mode switching processing (step S111), M(M1) and M(M2) become the same state. Since M(M1) and M(M2) are driven by similar processing in the speed priority mode, description of the processing at M(M2) is omitted.

When the speed priority mode is started, the control portion 50 waits for the radar signal Ls to be received during a period where a condition "F(M1)=0 and T(M1)=OFF" is not satisfied (a period where "F(M1)=1 or T(M1)=ON") (step S501; No, step S503; No). When the radar signal Ls is detected (step S501; Yes), the control portion 50 sets T(M1) to OFF (step S521), changes the channel Ch(M1), and sets F(M1) to 1 (step S523). Thereby, M(M1) is changed from the state where communication can be performed with the communication terminal 3 (non-restrictive state) to the state where communication cannot be performed (restrictive state), and the CAC is started at Ch(M1). Thereafter, the control portion 50 returns to step S501 to continue the processing. At this time, Ch(M1) is set as a channel different from Ch(M2). Ch(M1) may be not changed.

At step S503, when the condition "F(M1)=0 and T(M1)=OFF" is satisfied (step S503; Yes), the control portion 50 sets T(M1) to ON (step S511). The state where the condition "F(M1)=0 and T(M1)=OFF" is satisfied is, for example, a state where after the processing at steps S521 and S523 is executed, F(M1) is set from 1 to 0 by the flag processing. In other words, it is a state where one minute has elapsed since the CAC is started.

As described above, in the speed priority mode, although radio communication is in the restrictive state as conventional because the CAC is started upon the detection of the radar signal Ls, if one of the two communication modules maintains the ISM, the communication terminal 3 can switch the channel and continue radio communication.

As shown in FIG. 2, when the number of communication terminals 3 connected to the access point 1 becomes less than the threshold value Nth2 while the speed priority mode is being executed (step S115; Yes), the mode switching processing to switch from the speed priority mode to the connection priority mode is executed (step S121). This mode switching processing corresponds to switching the radio communication of the communication module M(M2) driven by the drive mode M2 from the non-restrictive state to the restrictive state, that is, setting T(M2) from ON to OFF. Thereby, M(M2) becomes the state where communication cannot be performed with the communication terminal 3 (restrictive state). At this time, when either T(M1) or T(M2) is OFF, the communication module corresponding to the one that is OFF may be applied as the drive mode M2. The above is the description of the communication control processing.

Second Embodiment

In a second embodiment, the processing performed when the determination at step S401 shown in FIG. 8 in the above-described connection switching processing is F(M2)=1 (step S401; No) is different from the processing of the first embodiment. That is, it corresponds to the processing in the state where the CAC is continued at M(M2) when connection of the communication terminal 3 to M(M2) is sought (state where switching to the ISM cannot be made).

Figure 10:
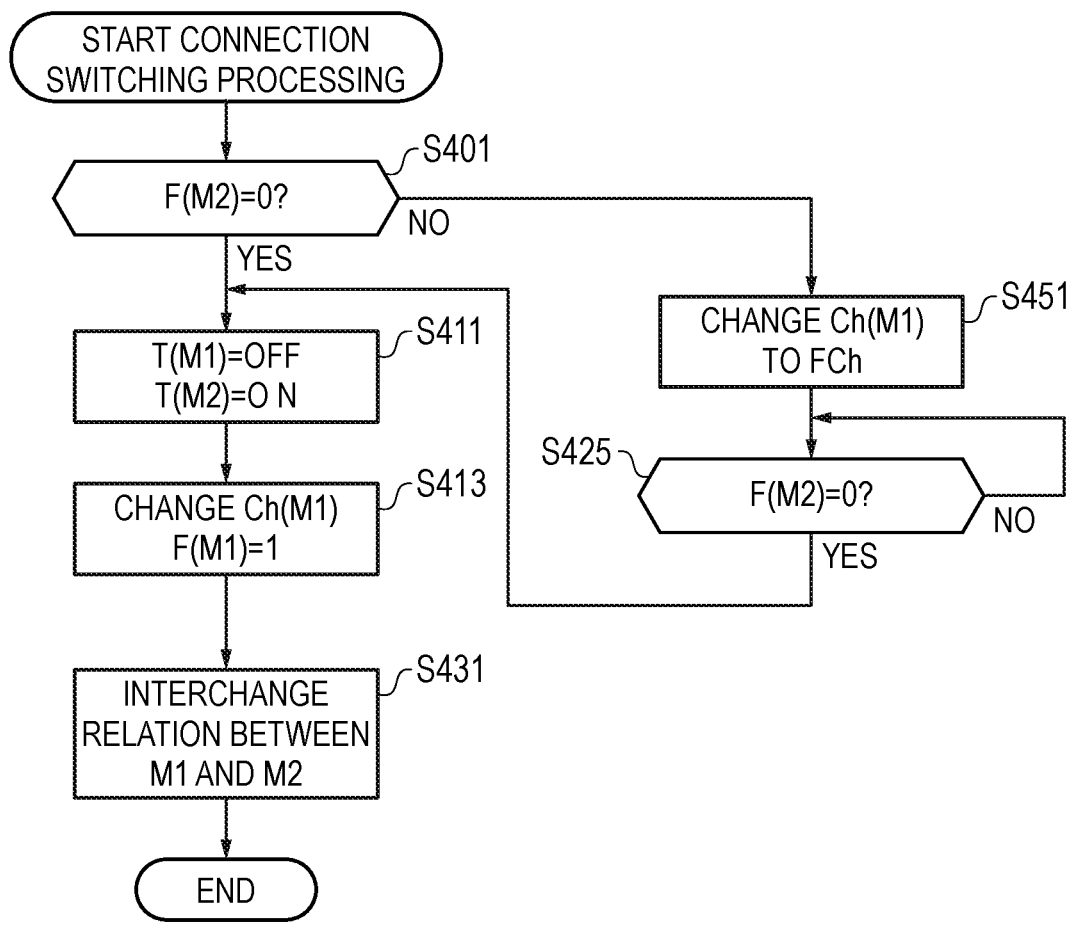
FIG. 10 is a flowchart explaining connection switching processing in a second embodiment of the present invention.

FIG. 10 is a flowchart explaining the connection switching processing in the second embodiment of the present invention. Since the processing performed when the determination at step S401 is F(M2)=1 (step S401; No) is different from the processing of the first embodiment, the processing will be described. Therefore, for the processing performed when the determination at step S401 is F(M2)=0 (step S401; Yes), the same reference numerals and signs are used for illustration, and descriptions thereof are omitted.

When F(M2)=1 at step S401 (step S401; No), the control portion 50 changes Ch(M1) to FCh (step S451). Here, FCh corresponds to a channel that does not need to use the DFS function even in the 5 GHz band (for example, a channel included in the type W52). At this channel which does not require the start of the CAC when used, although radio communication with the communication terminal 3 can be performed immediately, the communication speed generally tends to be low. Then, the control portion 50 waits for F(M2) to be set to 0 by the flag processing (step S425; No), and when F(M2) is set to 0 (step S425; Yes), the control portion 50 sets T(M1) to OFF and sets T(M2) to ON (step S411). The processing at step S411 may be executed not only when the processing at step S411 is executed immediately after F(M2) is set to 0 but also on condition that a preset time elapses after the processing at step S451.

By doing as in the second embodiment, even in the state where M(M2) cannot be changed to the ISM, the period during which radio communication cannot be performed can be reduced by temporarily changing the channel Ch(M1) of M(M1) to a channel that does not need to use the DFS function.

Third Embodiment

While the communication module Ma10 and the communication module Mb20 are accommodated in the same housing (the access point 1) in the first embodiment, they are accommodated in different housings (access points 1A and 1B) in a third embodiment. According to the conventional technology disclosed in JP-A-2010-278825, because of a legal restriction, it is necessary for the module for radar signal detection and the module for radio communication to be always accommodated in an integrated housing or disposed in positions close to each other enough to realize a performance similar to that when they are accommodated in an integrated housing. On the other hand, the communication module Ma10 and the communication module Mb20 can be accommodated in different housings because they are each capable of detecting the radar signal Ls, and further, the disposition positions thereof are unlimited.

Figure 11:
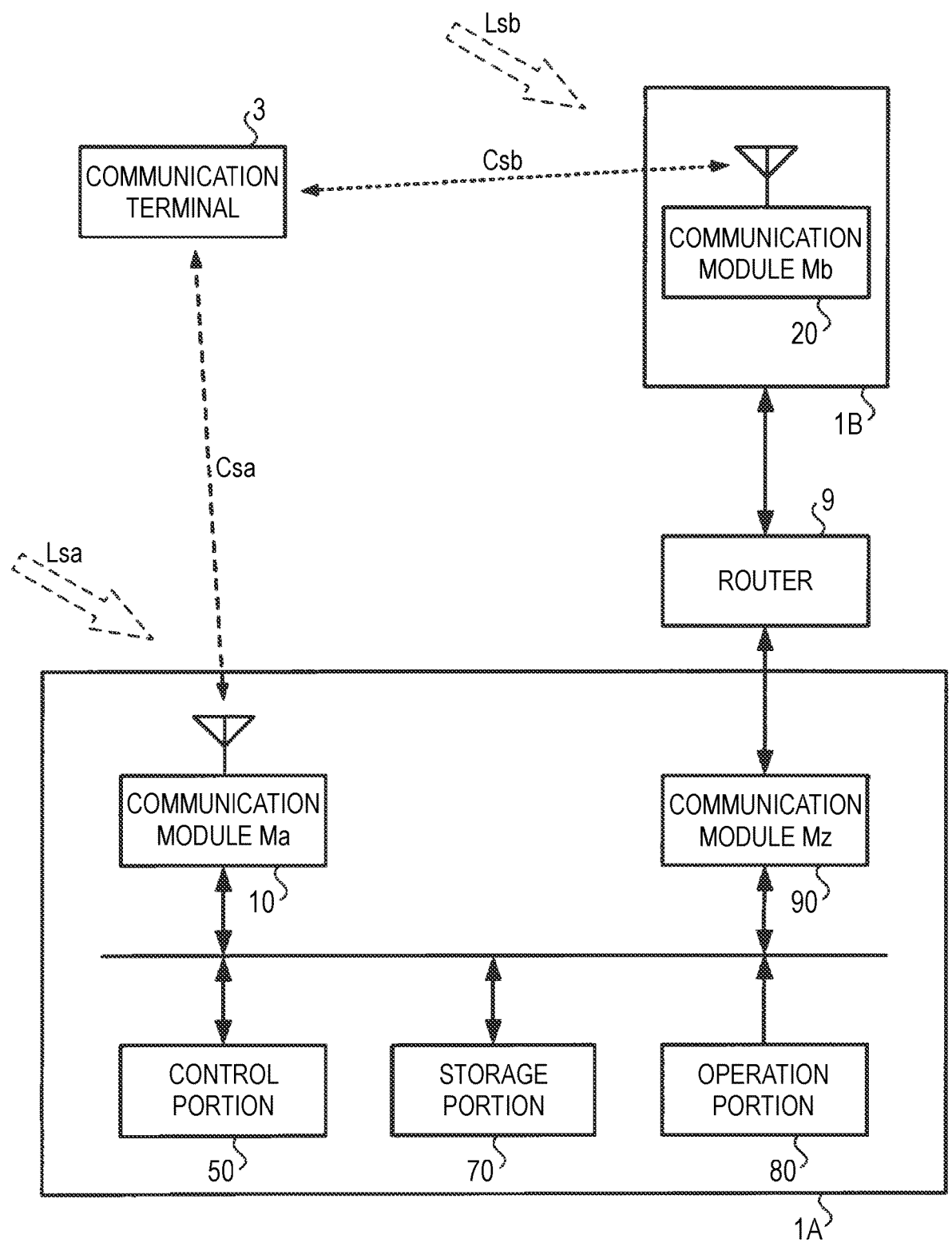
FIG. 11 is a view explaining the structure of a communication system in a third embodiment of the present invention.

FIG. 11 is a view explaining the structure of a communication system in the third embodiment of the present invention. As shown in FIG. 11, the access point 1A (communication device) has a structure where the communication module Mb20 is removed from the access point 1 of the first embodiment. On the other hand, the access point 1B of another housing has the communication module Mb20. The access point 1A and the access point 1B are connected through the router 9 in this example. For this reason, the control portion 50 of the access point 1A transmits a control signal for controlling the communication module Mb20 to the access point 1B through the router 9. Thereby, when this control signal is received at the access point 1B, the communication module Mb20 is controlled according to the control signal. Moreover, a signal indicative of information at the access point 1B (including, for example, information indicating that the radar signal Ls is received) is received by the control portion 50 of the access point 1A through the router 9. For this reason, processing similar to the communication control processing executed at the access point 1 in the first embodiment can be substantially implemented by the cooperation between the access points 1A and 1B in the third embodiment. The function of the access point 1A may be implemented by a router.

Fourth Embodiment

In the third embodiment, the structure is different from that of the first embodiment in that the communication module Mb20 is accommodated in the access point 1B as another housing. In a fourth embodiment, further, an example will be described in which the communication module Ma10 is also implemented in a housing different from the control portion 50.

Figure 12:
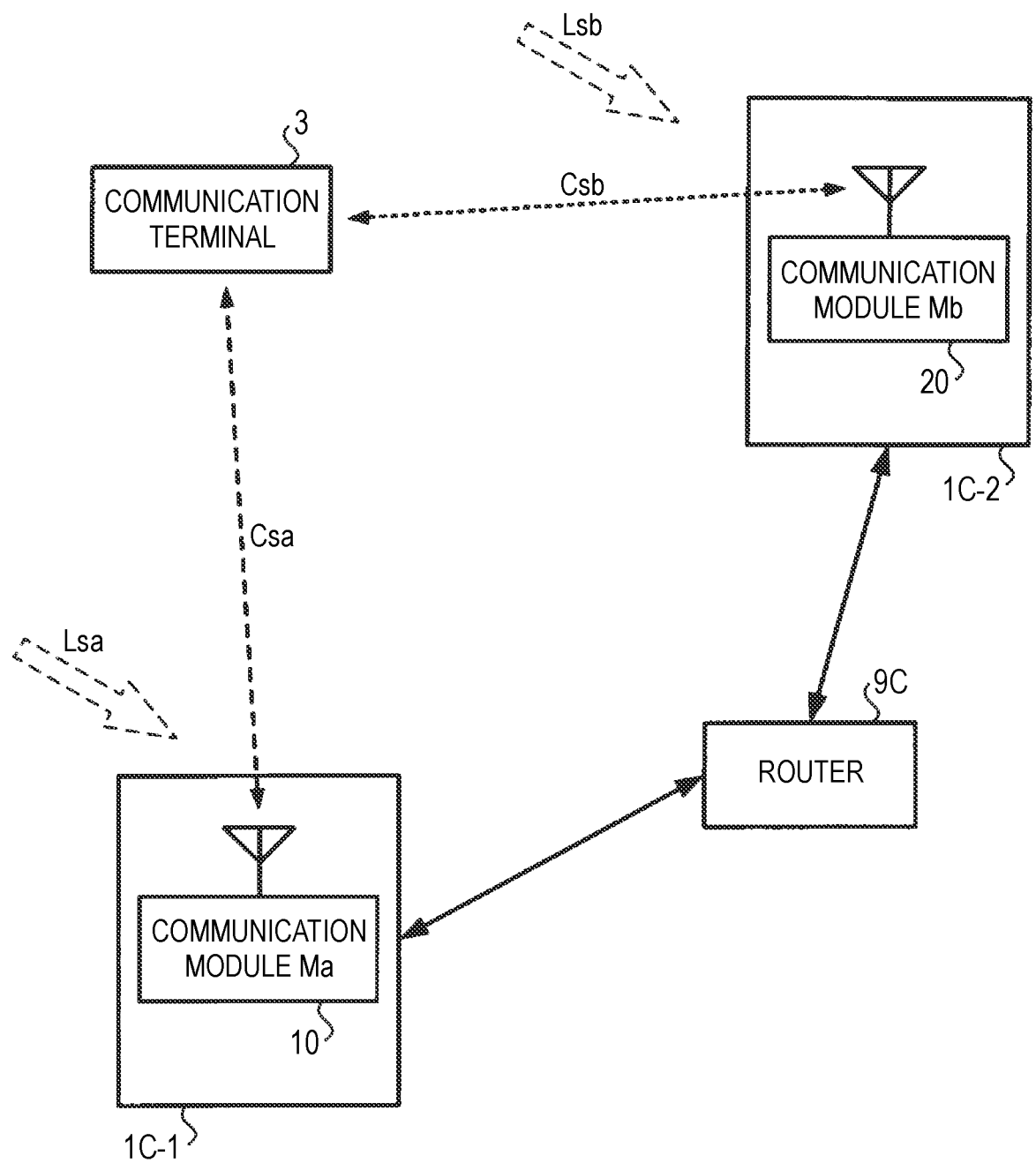
FIG. 12 is a view explaining the structure of a communication system in a fourth embodiment of the present invention.

FIG. 12 is a view explaining the structure of a communication system in the fourth embodiment of the present invention. As shown in FIG. 12, the communication module Ma10 is accommodated in an access point 1C-1, and the communication module Mb20 is accommodated in an access point 1C-2. On the other hand, the control portion 50 that executes the communication control processing in the first embodiment is accommodated in a router 9C (control device). In this case, the control portion of the router 9C transmits a control signal for controlling the communication module Ma10 to the access point 1C-1. Thereby, when this control signal is received at the access point 1C-1, the communication module Ma10 is controlled according to the control signal. Moreover, a control signal for controlling the communication module Mb20 is transmitted to the access point 1C-2. Thereby, when this control signal is received at the access point 1C-2, the communication module Mb20 is controlled according to the control signal. For this reason, processing similar to the communication control processing executed at the access point 1 in the first embodiment can be substantially implemented by the cooperation between the access points 1C-1 and 1C-2 and the router 9C in the fourth embodiment. The function of the control portion 50 may be possessed by another device (control device) connected through the router 9C. In any case, it is necessary only that the communication system be constituted by a control device including the control portion 50 that controls the communication modules Ma10 and Mb20, and the communication modules Ma10 and Mb20. For example, as described above, the control device may be the control portion 50 included in the access point or the router, or may be a device that controls them.

Modifications

While embodiments of the present invention have been described above, the embodiments of the present invention may be modified in various forms as shown below. Moreover, the above-described embodiments and the modifications described below may be applied in combination.

(1) The control portion 50 may function as a registration portion that registers the channel where the radar signal Ls is detected into the storage portion 70 when the radar signal Ls is detected in the communication control processing. The control portion 50 may determine, by referring to the registered channel, the channel after the change according to this registered channel when the channel of the communication module is changed. There are cases in which the channel where the radar signal Ls is detected depends on the access point installation area. In such cases, the frequency of detection of the radar signal Ls can be reduced by the control portion 50 determining a channel other than the registered channel as the channel after the change.

The channel registered in the storage portion 70 in this manner may be transmitted to a server connected through the Internet in a state of being associated with information on the position where the access point 1 is installed. By registering the channel to the server in this manner, another access point can also determine the channel after the change by referring to the information on the server with the its own position information as the search key. At this time, the position information may be inputted by the user or may be obtained by using a sensor that measures position information such as the GPS.

(2) While in the above-described embodiments, the communication control processing uses the two communication modules Ma10 and Mb20 that perform radio communication in the 5 GHz band, three or more communication modules may be used. It is necessary only that at least the communication module M(M1) driven by the drive mode M1 and the communication module M(M2) driven by the drive mode M2 described above be present, and communication modules other than these may be applied variously. For example, when three communication modules of the 5 GHz band are used, the control portion 50 may drive two by the drive mode M1 and drive one by the drive mode M2, or may drive one by the drive mode M1 and drive two by the drive mode M2. Moreover, a structure may be adopted where one is driven by the drive mode M1, another is driven by the drive mode M2 and the other is set to a channel included in the type W52.

As described above, according to an embodiment of the present invention, a communication system is provided that has a first module, a second module and a control portion. Moreover, according to an embodiment of the present invention, a communication device is provided that has a first module, a communication portion communicating with a second module, and a control portion. Further, the following structure may be adopted:

When the priority signal using the first channel is detected before a predetermined time elapses from the detection of the priority signal using the second channel when the second radio communication is in the restrictive state, the control portion may execute third processing of changing the channel of the first module to a predetermined channel and execute the first processing and the second processing after executing the third processing.

The predetermined time may be one minute.

A housing that accommodates the first module and the second module may be further provided.

The control portion may execute the first processing when the number of communication terminals using the first radio communication exceeds a predetermined number when the first radio communication is in the non-restrictive state and the second radio communication is in the restrictive state.

The control portion may further execute fourth processing of changing the channel being set to the first module from the first channel to a third channel different from the second channel.

A registration portion that registers the channel where the priority signal is detected into a memory is further provided, and the control portion determines the third channel according to the channel registered in the memory.

What is claimed is:
1. A communication device comprising:
a first module configured to perform a first radio communication using a first channel and to detect a priority signal using the first channel, the priority signal using the first channel being a signal that when detected, causes the first radio communication being performed using the first channel to be halted;

a communication portion configured to communicate with a second module that is configured to perform a second radio communication using a second channel different from the first channel and to detect a priority signal using the second channel, the priority signal using the second channel being a signal that when detected, causes the second radio communication being performed using the second channel to be halted;

a memory that stores instructions; and a processor that executes the instructions, wherein the instructions, when executed by the processor, cause the processor to:

execute a processing of changing the first radio communication to a non-restrictive state when a first signal is received from the second module in a state that the first radio communication is in a restrictive state; and execute a first processing of transmitting a second signal for changing the second radio communication to the non-restrictive state to the second module and a second processing of changing the first radio communication to the restrictive state when the priority signal using the first channel is detected in a state that the first radio communication is in the non-restrictive state.

2. The communication device according to claim 1, wherein the instructions, when executed by the processor, cause the processor to:

execute a third processing of changing the channel of the first module to a predetermined channel when the priority signal using the first channel is detected before a predetermined time elapses from the detection of the priority signal using the second channel in a state that the second radio communication is in the restrictive state; and execute the first processing and the second processing after executing the third processing.

3. The communication device according to claim 2, wherein the predetermined time is one minute.

4. The communication device according to claim 1, wherein the instructions, when executed by the processor, cause the processor to:

execute the first processing when the number of communication terminals using the first radio communication exceeds a predetermined number in a state that the first radio communication is in the non-restrictive state and the second radio communication is in the restrictive state.

5. The communication device according to claim 1, wherein the instructions, when executed by the processor, cause the processor to:

execute a fourth processing of changing the channel being set to the first module from the first channel to a third channel different from the second channel.

6. The communication device according to claim 5, further comprising:

a register configured to register the channel where the detected priority signal is used into a memory, wherein the instructions, when executed by the processor, cause the processor to:

determine the third channel in response to the channel registered in the memory.

7. A communication system comprising:

a first module configured to perform a first radio communication using a first channel and to detect a priority signal using the first channel, the priority signal using the first channel being a signal that when detected, causes the first radio communication being performed using the first channel to be halted;

a second module configured to perform a second radio communication using a second channel different from the first channel and to detect a priority signal using the second channel, the priority signal using the second channel being a signal that when detected, causes the second radio communication being performed using the second channel to be halted;

a memory that stores instructions; and a processor that executes the instructions, wherein the instructions, when executed by the processor, cause the processor to:

execute a first processing of changing the second radio communication to a non-restrictive state and a second processing of changing the first radio communication to a restrictive state when the priority signal using the first channel is detected in a state that the first radio communication is in the non-restrictive state and the second radio communication is in the restrictive state.

8. The communication system according to claim 7, wherein the instructions, when executed by the processor, cause the processor to:

execute a third processing of changing the channel of the first module to a predetermined channel when the priority signal using the first channel is detected before a predetermined time elapses from the detection of the priority signal using the second channel in a state that the second radio communication is in the restrictive state; and execute the first processing and the second processing after executing the third processing.

9. The communication system according to claim 8, wherein the predetermined time is one minute.

10. The communication system according to claim 1, further comprising:

a housing that accommodates the first module and the second module.

11. The communication system according to claim 1, wherein the instructions, when executed by the processor, cause the processor to:

execute the first processing when the number of communication terminals using the first radio communication exceeds a predetermined number in a state that the first radio communication is in the non-restrictive state and the second radio communication is in the restrictive state.

12. The communication system according to claim 7, wherein the instructions, when executed by the processor, cause the processor to:

execute a fourth processing of changing the channel being set to the first module from the first channel to a third channel different from the second channel.

13. The communication system according to claim 12, further comprising:

a register configured to register the channel where the detected priority signal is used into a memory, wherein the instructions, when executed by the processor, cause the processor to:

determine the third channel in response to the channel registered in the memory.

14. A control device for controlling a first module that performs a first radio communication using a first channel and detects a priority signal using the first channel, the priority signal using the first channel being a signal that when detected, causes the first radio communication being performed using the first channel to be halted, and a second module that performs a second radio communication using a second channel different from the first channel and detects a priority signal using the second channel, the priority signal using the second channel being a signal that when detected, causes the second radio communication being performed using the second channel to be halted, the control device comprising:

a memory that stores instructions; and
a processor that executes the instructions,
wherein the instructions, when executed by the processor, cause the processor to:
execute a first processing of changing the second radio communication to a non-restrictive state and a second processing of changing the first radio communication to a restrictive state when the priority signal using the first channel is detected in a state that the first radio communication is in the non-restrictive state and the second radio communication is in the restrictive state.

15. A communication control method of controlling a first module that performs a first radio communication using a first channel and detects a priority signal using the first channel, the priority signal using the first channel being a signal that when detected, causes the first radio communication being performed using the first channel to be halted, and a second module that performs a second radio communication using a second channel different from the second channel and detects a priority signal using the second channel, the priority signal using the second channel being a signal that when detected, causes the second radio communication being performed using the second channel to be halted, the control method comprising:

executing a first processing of changing the second radio communication to a non-restrictive state and a second processing of changing the first radio communication to a restrictive state when the priority signal using the first channel is detected in a state that the first radio communication is in the non-restrictive state and the second radio communication is in the restrictive state.

16. The communication control method according to claim 15, further comprising:
executing a third processing of changing the channel of the first module to a predetermined channel when the priority signal using the first channel is detected before a predetermined time elapses from the detection of the priority signal using the second channel in a state that the second radio communication is in the restrictive state; and
executing the first processing and the second processing after the third processing is executed.

17. The communication control method according to claim 16, wherein the predetermined time is one minute.

18. The communication control method according to claim 15, further comprising:
executing the first processing when the number of communication terminals using the first radio communication exceeds a predetermined number in a state that the first radio communication is in the non-restrictive state and the second radio communication is in the restrictive state.

19. The communication control method according to claim 15, further comprising:
executing a fourth processing of changing the channel that is set to the first module from the first channel to a third channel different from the second channel.

20. The communication control method according to claim 19, further comprising:
registering the channel where the detected priority signal is used into a memory; and
determining the third channel in response to the channel registered in the memory.

* * * * *